US008971960B2

(12) United States Patent
Kim

(10) Patent No.: US 8,971,960 B2
(45) Date of Patent: Mar. 3, 2015

(54) APPARATUS AND METHOD FOR SELECTING SIM CARD IN MOBILE TERMINAL

(75) Inventor: Jong-Woo Kim, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 724 days.

(21) Appl. No.: 12/877,415

(22) Filed: Sep. 8, 2010

(65) Prior Publication Data

US 2011/0070922 A1 Mar. 24, 2011

(30) Foreign Application Priority Data

Sep. 21, 2009 (KR) ........................ 10-2009-0088897

(51) Int. Cl.
*H04M 15/00* (2006.01)
*H04B 1/28* (2006.01)
*H04M 1/00* (2006.01)
*H04M 1/725* (2006.01)

(52) U.S. Cl.
CPC ...... *H04M 1/72519* (2013.01); *H04M 2250/66* (2013.01)
USPC ........................ 455/558; 379/114.01; 455/551

(58) Field of Classification Search
CPC .. H04L 63/0853; H04W 88/06; H04W 8/183; H04M 2250/66; H04M 1/72519
USPC ................ 455/558, 552.1; 379/114.01, 93.07
See application file for complete search history.

(56) References Cited

U.S. PATENT DOCUMENTS

| 7,929,993 | B2 * | 4/2011 | Nagarajan ..................... 455/558 |
| 8,385,893 | B2 * | 2/2013 | Gupta et al. ................. 455/414.1 |
| 2002/0154632 | A1 * | 10/2002 | Wang et al. .................... 370/389 |
| 2003/0153356 | A1 * | 8/2003 | Liu ................................ 455/558 |
| 2004/0229601 | A1 * | 11/2004 | Zabawskyj et al. ............ 455/417 |
| 2006/0177029 | A1 * | 8/2006 | Dotan et al. ............. 379/114.01 |
| 2007/0081641 | A1 * | 4/2007 | Veen et al. ................. 379/93.07 |
| 2008/0020773 | A1 * | 1/2008 | Black et al. .................... 455/445 |
| 2009/0088211 | A1 * | 4/2009 | Kim ................................ 455/558 |
| 2009/0117939 | A1 * | 5/2009 | Asthoff ....................... 455/552.1 |
| 2009/0163244 | A1 * | 6/2009 | Parkkinen et al. ............ 455/558 |
| 2009/0215490 | A1 * | 8/2009 | Lee et al. ....................... 455/558 |

FOREIGN PATENT DOCUMENTS

KR 2011136604 * 6/2010

* cited by examiner

*Primary Examiner* — Nizar Sivji
(74) *Attorney, Agent, or Firm* — Jefferson IP Law, LLP

(57) ABSTRACT

An apparatus and a method for establishing a call connection via a desired SIM card using a specific code corresponding to the SIM card without selecting or changing the SIM card in a mobile terminal that supports a plurality of SIM cards are provided. The apparatus includes a SIM manager and a controller. The SIM manager selects a desired SIM card among the plurality of the SIM cards using a specific code corresponding to a desired SIM card. The controller processes to attempt to establish a call using the SIM card selected by the SIM manager.

12 Claims, 4 Drawing Sheets

APPARATUS AND METHOD FOR SELECTING SIM CARD IN MOBILE TERMINAL

PRIORITY

This application claims the benefit under 35 U.S.C. §119(a) of a Korean patent application filed in the Korean Intellectual Property Office on Sep. 21, 2009 and assigned Serial No. 10-2009-0088897, the entire disclosure of which is hereby incorporated by reference.

BACKGROUND OF THE INVENTION

1. Field of the Invention

The present invention relates to an apparatus and a method for selecting a Subscriber Identity Module (SIM) card in a mobile terminal. More particularly, the present invention relates to an apparatus and a method for establishing a call via a desired SIM card using a specific code corresponding to the SIM card without selecting or changing the SIM card in a mobile terminal that supports a plurality of SIM cards.

2. Description of the Related Art

Due to the development of communication technologies, network systems of various communication schemes are now provided. Various kinds of network systems may be supported and one network system may be provided depending on the region. Additionally, the various kinds of network systems provide different billing systems depending on the service provider. For example, in Russia, fees vary for each kind of a network depending on the region. Therefore, the conventional art provides a technique for mounting two Subscriber Identity Module (SIM) cards on one mobile terminal to support two kinds of networks, so that a user may selectively receive a desired network service depending on the user's desires.

At this point, the mobile terminal stores two pieces of International Mobile Subscriber Identity (IMSI) information in one SIM card and selects IMSI information according to a user's selection or supports two SIM cards using two main chips as if two terminals were assembled in one case to use IMSI information stored in each SIM card.

The mobile terminal that uses IMSI information stored in each SIM card by supporting two SIM cards needs to input a counterpart user's phone number for call establishment, and select a desired SIM card using a SIM card selection key in order to allow a user to establish a call using a desired SIM card.

As described above, a process of selecting a SIM card to be used through a key for changing a SIM card requires separate key input, causing inconvenience to a user, and increasing the amount of time it takes to establish a call.

For example, when a user desires to establish a call using a second SIM card but a first SIM card is selected in the mobile terminal, a user of the mobile terminal inputs a counterpart user's phone number, changes from the first SIM card to the second SIM card using a key for changing a SIM card, and then presses a TALK button, thereby initiating a call using the second SIM card.

In the above-described method, a general call establishment process is performed only in the case where a SIM card to be used by a user and a SIM card selected by the mobile terminal are the same. When the SIM card to be used by the user and the SIM card selected by the mobile terminal are not the same, a separate process of changing a SIM card needs to be performed.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for reducing a call establishment procedure in a mobile terminal that supports a plurality of Subscriber Identity Module (SIM) cards.

Another aspect of the present invention is to provide an apparatus and a method for selecting a desired SIM card using a corresponding specific code in a mobile terminal that supports a plurality of SIM cards.

In accordance with an aspect of the present invention, an apparatus for selecting a SIM card among a plurality of SIM cards in a mobile terminal is provided. The apparatus includes a SIM manager for selecting a SIM card among the plurality of the SIM cards using a specific code corresponding to a desired SIM card, and a controller for processing to attempt to establish a call using the SIM card selected by the SIM manager.

In accordance with another aspect of the present invention, a method for selecting a SIM card among a plurality of SIM cards in a mobile terminal is provided. The method includes selecting a SIM card among the plurality of the SIM cards using a specific code corresponding to a desired SIM card, and attempting to establish a call using the selected SIM card.

In accordance with yet another aspect of the present invention, a method for selecting a SIM card among a plurality of SIM cards in a mobile terminal is provided. The method includes identifying a specific code corresponding to a desired SIM card and a counterpart user's number from an input to establish a call, the specific code and the counterpart user's number being input together, selecting a SIM card among the plurality of the SIM cards corresponding to the identified specific code, and attempting to establish a call using the selected SIM card.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and a method for reducing a call connection procedure in a mobile terminal by selecting a desired Subscriber Identity Module (SIM) card using a specific code corresponding to the SIM card in the mobile terminal that supports a plurality of SIM cards.

Figure 1:
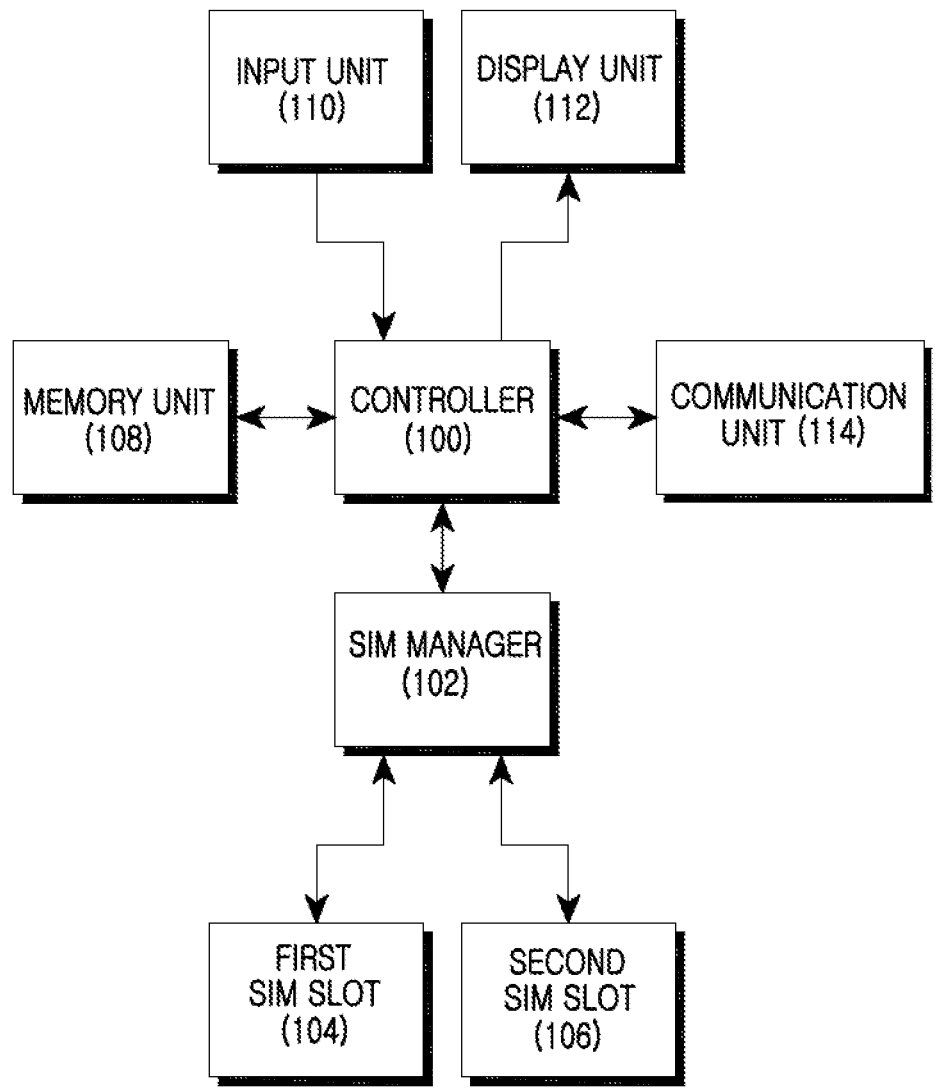
FIG. 1 is a block diagram illustrating a mobile terminal for selecting a SIM card using a specific code according to an exemplary embodiment of the present invention.

FIG. 1 is a block diagram illustrating a mobile terminal for selecting a SIM card using a specific code according to an exemplary embodiment of the present invention.

Referring to FIG. 1, the mobile terminal may include a controller 100, a SIM manager 102, a first slot 104, a second slot 106, a memory unit 108, an input unit 110, a display unit 112, and a communication unit 114. The portable terminal may include additional units. Similarly, the functionality of two or more of the above units may be integrated into a single component.

The controller 100 of the mobile terminal controls overall operations of the mobile terminal. For example, the controller 100 controls a process for voice communication and data communication. In addition to general operations, when detecting a user's input for call connection, the controller 100 identifies a specific code for selecting a SIM card from the input to determine which SIM card is to be used by the user.

After that, the controller 100 processes to attempt to establish a call via the determined SIM card using the specific code.

The SIM manager 102 analyzes a user's input to establish a call under the control of the controller 100 to identify the specific code and a counterpart user's phone number to which the user desires to attempt to establish a call.

The first SIM slot 104 and the second SIM slot 106 each allow mounting of a SIM card that stores a user's various information and supported network information. A first SIM card and a second SIM card (not shown) mountable/detachable to/from the first SIM slot 104 and the second SIM slot 106 can be mounted/detached to/from the mobile terminal. Each of the first SIM card and the second SIM card has a microprocessor and a memory chip, and store a user's various information and supported network information.

The memory unit 108 includes, for example, Read Only Memory (ROM), Random Access Memory (RAM), a flash ROM, and the like. The ROM stores microcode (i.e., code) of programs for processes and controls of the controller 100 and the SIM manager 102, and various reference data.

The RAM serves as a working memory of the controller 100 and stores temporary data that is used during execution of various programs. The flash ROM stores various updatable data for storage such as a phonebook, sent messages, and received messages.

The input unit 110 includes a plurality of function keys such as numerical key buttons of 0 to 9, a menu button, a cancel button, an OK button, a TALK button, an END button, an Internet access button, navigation key buttons, letter input keys, and the like. The input unit 110 provides key input data (e.g., input of a specific code for selecting a SIM) corresponding to a key pressed by a user to the controller 100. These keys are merely examples of keys which may make up the input unit 110. That is, the input unit may include additional or different keys, or different input mechanisms through which the user supplies input to the portable terminal.

The display unit 112 displays status information generated during an operation of the mobile terminal, letters, moving images, still images, and the like. The display unit 112 may be a color Liquid Crystal Display (LCD), an Active Mode Organic Light Emitting Diode (AMOLED), and the like.

The communication unit 114 transmits/receives a Radio Frequency (RF) signal of data input/output via an antenna (not illustrated). For example, during transmission, the communication unit 114 channel-codes and spreads data to be transmitted, and then performs an RF process on the signal to transmit the signal. During reception, the communication unit 114 converts a received RF signal into a baseband signal, and despreads and channel-decodes the baseband signal to recover data.

A function of the SIM manager 102 may be performed by the controller 100 of the mobile terminal. The separate configuration and illustration of the SIM manager 102 is merely an example that is used for convenience in description, and should not be considered as limiting the scope of the present invention. It would be obvious to those skilled in the art that various modifications may be made within the scope of the present invention. For example, some or all functions of the SIM manager 102 may be processed by the controller 100.

Up to now, an apparatus for reducing a procedure to establish a call in a mobile terminal that supports a plurality of SIM cards has been described. Hereinafter, a method for reducing a procedure to establish a call in a mobile terminal by selecting a desired SIM card using a specific code corresponding to the SIM card using the above apparatus according to an exemplary embodiment of the present invention is described.

Figure 2:
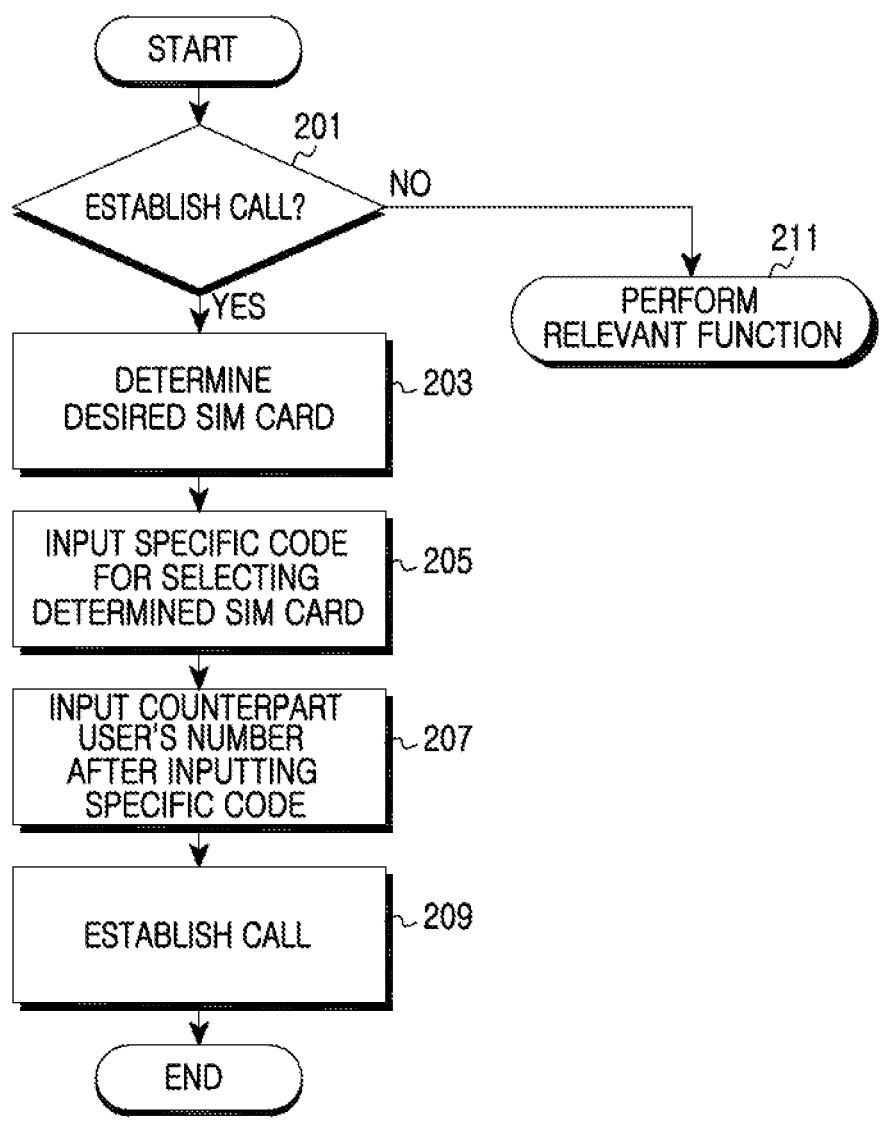
FIG. 2 is a flowchart illustrating a process for allowing a user of a mobile terminal to establish a call according to an exemplary embodiment of the present invention.

FIG. 2 is a flowchart illustrating a process for allowing a user of a mobile terminal to establish a call according to an exemplary embodiment of the present invention.

Referring to FIG. 2, the user of the mobile terminal determines whether to establish a call in step 201.

If the user determines in step 201 not to establish a call, the user performs a relevant function on the mobile terminal (e.g., allows the mobile terminal to remain in a standby mode) in step 211.

In contrast, if is the user determines in step 201 to establish a call, the user determines a SIM card to be used in step 203. Here, the mobile terminal is a mobile terminal that supports two SIM cards. The user of the mobile terminal does not select a SIM card to be used through a key or a menu allowing the user to select the two SIM cards, but instead determines which SIM card is the SIM card through which the user desires to communicate.

The user of the mobile terminal inputs a specific code for selecting a SIM card (determined in step 203) in step 205, and inputs a counterpart user's number to which the call is to be established in step 207.

That is, according to an exemplary embodiment of the present invention, the user of the mobile terminal initiates the establishment of a call using a desired SIM card, without a separate procedure of selecting a SIM card, by inputting a specific code corresponding to the SIM card and the counterpart user's number. The specific code may be directly set or changed by the user of the mobile terminal.

The mobile terminal attempts to establish the call with the counterpart user using the SIM card corresponding to the specific code (input in step 207) in step 209. Thereafter, the present algorithm ends.

Figure 3:
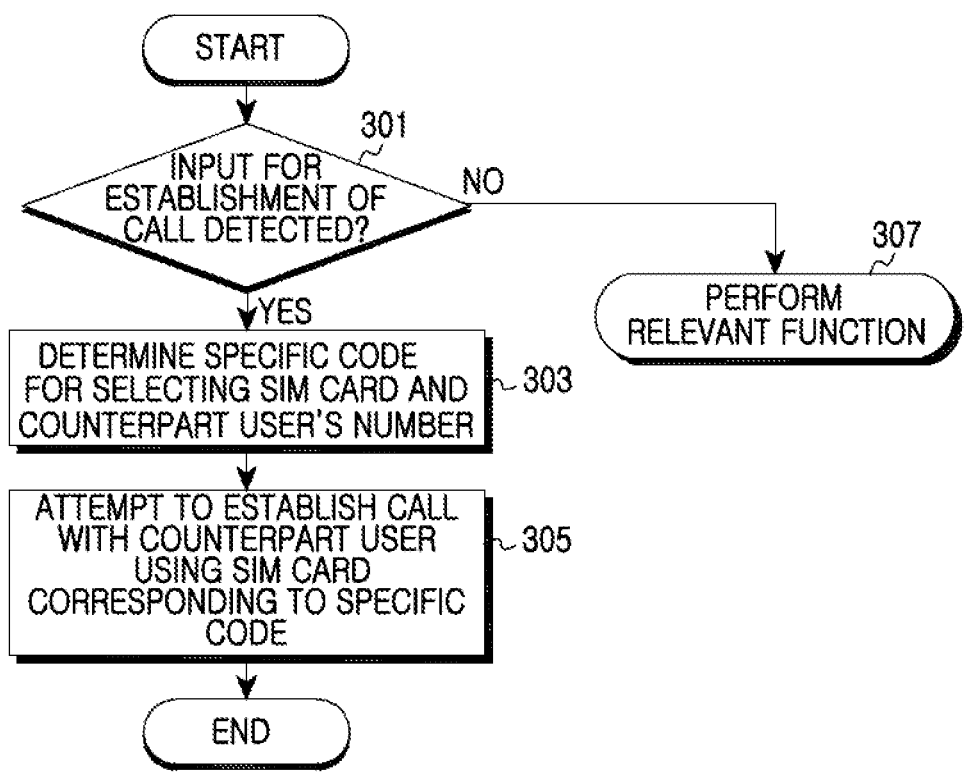
FIG. 3 is a flowchart illustrating a process for determining a specific code corresponding to a SIM card to establish a call in a mobile terminal according to an exemplary embodiment of the present invention.

FIG. 3 is a flowchart illustrating a process for determining a specific code corresponding to a SIM card to establish a call in a mobile terminal according to an exemplary embodiment of the present invention.

Referring to FIG. 3, the mobile terminal determines whether input for establishing a call from a user is detected in step 301. Here, the input for establishing the call is a request for establishing the call with a counterpart user, and denotes an input including a specific code for selecting a SIM card and the counterpart user's phone number.

If it is determined in step 301 that the input for establishing the call from the user is not detected, the mobile terminal performs a relevant function (e.g., a standby mode) in step 307.

In contrast, if it is determined in step 301 that the input for establishing the call from the user is detected, the mobile terminal identifies a specific code for selecting a SIM card and the counterpart user's phone number from the input for establishing the call (detected in step 301) in step 303.

For example, assuming that the mobile terminal is a mobile terminal that supports two SIM cards, a specific code for selecting a first SIM card may be #1#, a specific code for selecting a second SIM card may be #2#, and when an input for establishing the call of #2#+010 123-4567 is given, the mobile terminal identifies a specific code of #2# and a user's number of 010-123-4567. The mobile terminal that has identified the specific code and the user's number may determine that the user selects the second SIM card to perform call connection.

As described above, the user may directly initiate the establishment of a call using a desired SIM card even without performing a separate procedure of selecting a SIM card by using a specific code for selecting the SIM card.

The mobile terminal attempts to establish a call with a counterpart user using the SIM card corresponding to the specific code in step 305. Thereafter, the present algorithm ends.

Figure 4:
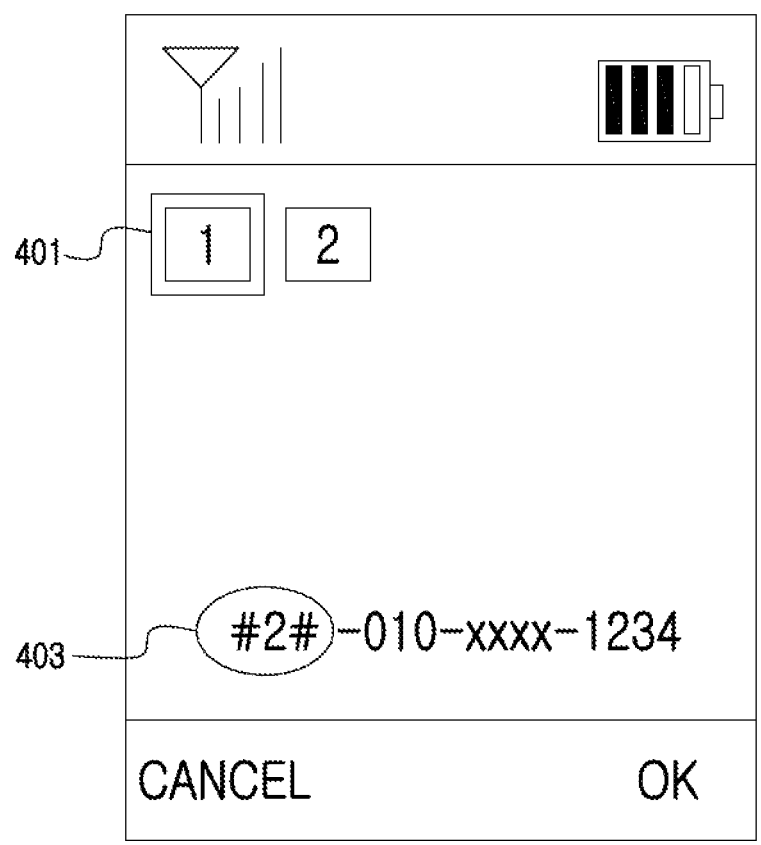
FIG. 4 is a view illustrating a call establishment screen that uses a specific code in a mobile terminal according to an exemplary embodiment of the present invention.

FIG. 4 is a view illustrating a call establishment screen that uses a specific code in a mobile terminal according to an exemplary embodiment of the present invention.

Referring to FIG. 4, it is assumed that the mobile terminal supports two SIM cards (i.e., a first SIM card and a second SIM card) as described above, a specific code for selecting the first SIM card is #1#, and a specific code for selecting the second SIM card is #2#. Specific codes corresponding to the two SIM cards may be directly changed by the user.

Additionally, as illustrated, the mobile terminal operates by selecting the first SIM card 401 from the two SIM cards.

In the case where a user desires to establish a call via the second SIM card using the conventional mobile terminal, since the first SIM card is selected in the mobile terminal, the user needs to change from the first SIM card to the second SIM card using a separate SIM selection key, and then establish a call with a counterpart user. That is, the conventional mobile terminal passes through a process of inputting a phone number→SIM card select key→changing from the first SIM to the second SIM→Send→establish a call.

In contrast, a mobile terminal according to an exemplary embodiment of the present invention may establish a call using a desired SIM card even without selecting or changing a SIM card by using a specific code for selecting a SIM card in advance.

For example, as described above, in the case where a mobile terminal operates by selecting the first SIM card from the two SIM cards and intends to establish a call using the second SIM card, the mobile terminal according to an exemplary embodiment of the present invention may directly establish a call using a desired SIM card without performing a process of selecting and changing a SIM card by inputting #2#(403) for selecting the second SIM card and a counterpart user's number (#2#010 123 4567).

As described above, exemplary embodiments of the present invention provide an apparatus and a method for shortening a call establishment procedure in a mobile terminal by selecting a desired SIM card using a specific code corresponding to the SIM card in the mobile terminal that supports a plurality of SIM cards. Therefore, the mobile terminal may select a SIM card desired by a user without a separate process of selecting a SIM card by using the specific code.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for selecting a Subscriber Identity Module (SIM) card among a plurality of SIM cards in a mobile terminal, the apparatus comprising:
    a SIM manager configured to receive a user input of a specific code uniquely corresponding to one desired SIM card and to select a SIM card from among the plurality of the SIM cards using the specific code uniquely corresponding to one desired SIM card; and
    a controller configured to execute an attempt to establish an outgoing call to a counterpart user's mobile terminal using the SIM card selected by the SIM manager,
    wherein the specific code uniquely corresponding to the one desired SIM card is input by a user of the mobile terminal together with a mobile terminal number for the counterpart user's mobile terminal,
    wherein, when detecting an input to attempt to establish the outgoing call, the SIM manager is further configured to identify the specific code and the mobile terminal number from the user input, and to select the SIM card corresponding to the identified specific code, and
    wherein the specific code comprises at least one of a special character and an alphabet identified from the user input.

2. The apparatus of claim 1, wherein the specific code is at least one of set by the user of the mobile terminal and changed by the user of the mobile terminal.

3. The apparatus of claim 1, wherein the apparatus configured to reduce an input process for establishing the call.

4. The apparatus of claim 1, wherein the SIM manager is configured to not allow the user to select the SIM card through at least one of a key and a menu.

5. A method for selecting a Subscriber Identity Module (SIM) card among a plurality of SIM cards in a mobile terminal, the method comprising:
- receiving a user input of a specific code uniquely corresponding to one desired SIM card;
- selecting a SIM card from among the plurality of the SIM cards using the specific code uniquely corresponding to one desired SIM card; and
- attempting to establish an outgoing call to a counterpart user's mobile terminal using the selected SIM card,
- wherein the specific code uniquely corresponding to the one desired SIM card is input by a user of the mobile terminal together with a mobile terminal number for the counterpart user's mobile terminal,
- wherein the selecting of the SIM card from among the plurality of the SIM cards using the specific code comprises:
  - identifying the specific code and the mobile terminal number from the user input; and
  - selecting the SIM card corresponding to the identified specific code, and
- wherein the specific code comprises at least one of a special character and an alphabet identified from the user input.

6. The method of claim 5, wherein the specific code is at least one of set by the user of the mobile terminal and changed by the user of the mobile terminal.

7. The method of claim 5, wherein the selecting of the SIM card does not comprise selecting the SIM card, by the user, through at least one of a key and a menu.

8. The method of claim 5, wherein the method reduces an input process to establish the call.

9. A method for selecting a Subscriber Identity Module (SIM) card among a plurality of SIM cards in a mobile terminal, the method comprising:
- receiving and identifying a user input of a specific code uniquely corresponding to one desired SIM card and a mobile terminal number, the mobile terminal number corresponding to a counterpart user's mobile terminal, from an input to establish an outgoing call to the counterpart user's mobile terminal, the specific code and the mobile terminal number being input together;
- selecting one SIM card, from among the plurality of the SIM cards, corresponding to the specific code uniquely corresponding to one desired SIM card; and
- attempting to establish the outgoing call to the counterpart user's mobile terminal using the selected SIM card,
- wherein the specific code comprises at least one of a special character and an alphabet identified from the input to establish the call.

10. The method of claim 9, wherein the specific code is at least one of set by a user of the mobile terminal and changed by a user of the mobile terminal.

11. The method of claim 9, wherein the selecting of the one SIM card does not comprise selecting the SIM card, by a user, through at least one of a key and a menu.

12. The method of claim 9, wherein the method reduces an input process to establish the call.

\* \* \* \* \*